US010727551B2

(12) United States Patent
Muniz et al.

(10) Patent No.: US 10,727,551 B2
(45) Date of Patent: Jul. 28, 2020

(54) BATTERY WITH LIQUID TEMPERATURE CONTROLLING SYSTEM

(71) Applicant: Wisk Aero LLC, Mountain View, CA (US)

(72) Inventors: Thomas P. Muniz, Sunnyvale, CA (US); John Melack, Redwood City, CA (US)

(73) Assignee: WISK AERO LLC, Mountain View, CA (US)

( * ) Notice: Subject to any disclaimer, the term of this patent is extended or adjusted under 35 U.S.C. 154(b) by 0 days.

(21) Appl. No.: 16/667,469

(22) Filed: Oct. 29, 2019

(65) Prior Publication Data

US 2020/0194852 A1 Jun. 18, 2020

Related U.S. Application Data

(63) Continuation of application No. 16/217,616, filed on Dec. 12, 2018, now Pat. No. 10,497,996.

(51) Int. Cl.
| | |
|---|---|
| *H01M 10/63* | (2014.01) |
| *H01M 10/6567* | (2014.01) |
| *H01M 10/625* | (2014.01) |
| *B60L 58/26* | (2019.01) |
| *H01M 10/617* | (2014.01) |

(Continued)

(52) U.S. Cl.
CPC ............ *H01M 10/63* (2015.04); *B60L 53/80* (2019.02); *B60L 58/18* (2019.02); *B60L 58/26* (2019.02); *H01M 10/44* (2013.01); *H01M 10/60* (2015.04); *H01M 10/613* (2015.04); *H01M 10/615* (2015.04); *H01M 10/617* (2015.04); *H01M 10/625* (2015.04); *H01M 10/65* (2015.04); *H01M 10/6567* (2015.04); *B60L 2200/10* (2013.01); *B60L 2240/36* (2013.01); *H01M 2220/20* (2013.01)

(58) Field of Classification Search
CPC ..................................................... H01M 10/63
USPC ........................................................ 320/150
See application file for complete search history.

(56) References Cited

U.S. PATENT DOCUMENTS

| | | | | |
|---|---|---|---|---|
| 4,415,847 | A | * | 11/1983 | Galloway ........... H01M 10/365 |
| | | | | 320/150 |
| 5,524,681 | A | * | 6/1996 | Davies ..................... F01P 11/02 |
| | | | | 123/41.14 |

(Continued)

OTHER PUBLICATIONS

U.S. Appl. No. 16/217,616, "Non-Final Office Action" dated Mar. 20, 2019, 21 pages.

(Continued)

*Primary Examiner* — Jerry D Robbins
(74) *Attorney, Agent, or Firm* — Kilpatrick Townsend & Stockton LLP

(57) ABSTRACT

A liquid temperature controlling system is used to circulate a temperature controlled liquid between the liquid temperature controlling system and a battery to produce a temperature controlled battery. The battery and the liquid temperature controlling system are detachably coupled at least while the temperature controlled liquid is circulated. The temperature controlled liquid is removed from the temperature controlled battery. The battery and the liquid temperature controlling system are decoupled after the temperature controlled liquid is removed. A charger is used to charge the temperature controlled battery.

14 Claims, 6 Drawing Sheets

(51) Int. Cl.
*H01M 10/615* (2014.01)
*H01M 10/44* (2006.01)
*H01M 10/60* (2014.01)
*B60L 58/18* (2019.01)
*B60L 53/80* (2019.01)
*H01M 10/65* (2014.01)
*H01M 10/613* (2014.01)

(56) References Cited

U.S. PATENT DOCUMENTS

| | | |
|---|---|---|
| 9,252,463 B2 | 2/2016 | Yang et al. |
| 9,444,124 B2 | 9/2016 | Beltz et al. |
| 9,692,096 B2 | 6/2017 | Harris |
| 10,497,996 B1 | 12/2019 | Muniz et al. |
| 2007/0087266 A1 | 4/2007 | Bourke et al. |
| 2008/0202741 A1 | 8/2008 | Lee et al. |
| 2009/0155675 A1 | 6/2009 | Houchin-Miller |
| 2010/0089669 A1* | 4/2010 | Taguchi ............... B60K 6/365 180/65.1 |
| 2011/0293974 A1* | 12/2011 | Yoon ................... H01M 2/1083 429/72 |
| 2012/0043935 A1* | 2/2012 | Dyer ...................... B60L 53/31 320/109 |
| 2013/0029193 A1* | 1/2013 | Dyer ................... H01M 10/486 429/62 |
| 2014/0292260 A1* | 10/2014 | Dyer ........................ H02J 7/00 320/107 |
| 2014/0342197 A1 | 11/2014 | Andres et al. |
| 2015/0054460 A1* | 2/2015 | Epstein ................ B60L 11/187 320/109 |
| 2017/0005383 A1* | 1/2017 | Harris ............... H01M 10/6557 |
| 2017/0288286 A1* | 10/2017 | Buckhout ........... H01M 2/1077 |
| 2019/0047429 A1* | 2/2019 | Torkelson ........... H01M 10/486 |

OTHER PUBLICATIONS

U.S. Appl. No. 16/217,616, "Notice of Allowance" dated Jul. 24, 2019, 10 pages.

PCT/US2019/066057, "International Search Report and Written Opinion", dated Feb. 25, 2020, 11 pages.

* cited by examiner

BATTERY WITH LIQUID TEMPERATURE CONTROLLING SYSTEM

CROSS-REFERENCE TO RELATED APPLICATIONS

This application is a continuation of U.S. application Ser. No. 16/217,616, filed Dec. 12, 2018, entitled "Battery with Liquid Temperature Controlling System" which is incorporated herein by reference in its entirety.

BACKGROUND OF THE INVENTION

New types of all-electric vehicles, including all-electric aircraft, are being developed. New techniques and/or devices which improve the operation and/or management of such all-electric vehicles would be desirable. For example, such vehicles may be deployed in a fleet or shared usage application and increasing the "up time" of such vehicles would be desirable (e.g., because more riders can be served by the fleet of vehicles and/or the wait time for an available vehicle is reduced).

BRIEF DESCRIPTION OF THE DRAWINGS

Various embodiments of the invention are disclosed in the following detailed description and the accompanying drawings.

DETAILED DESCRIPTION

Figure 1:
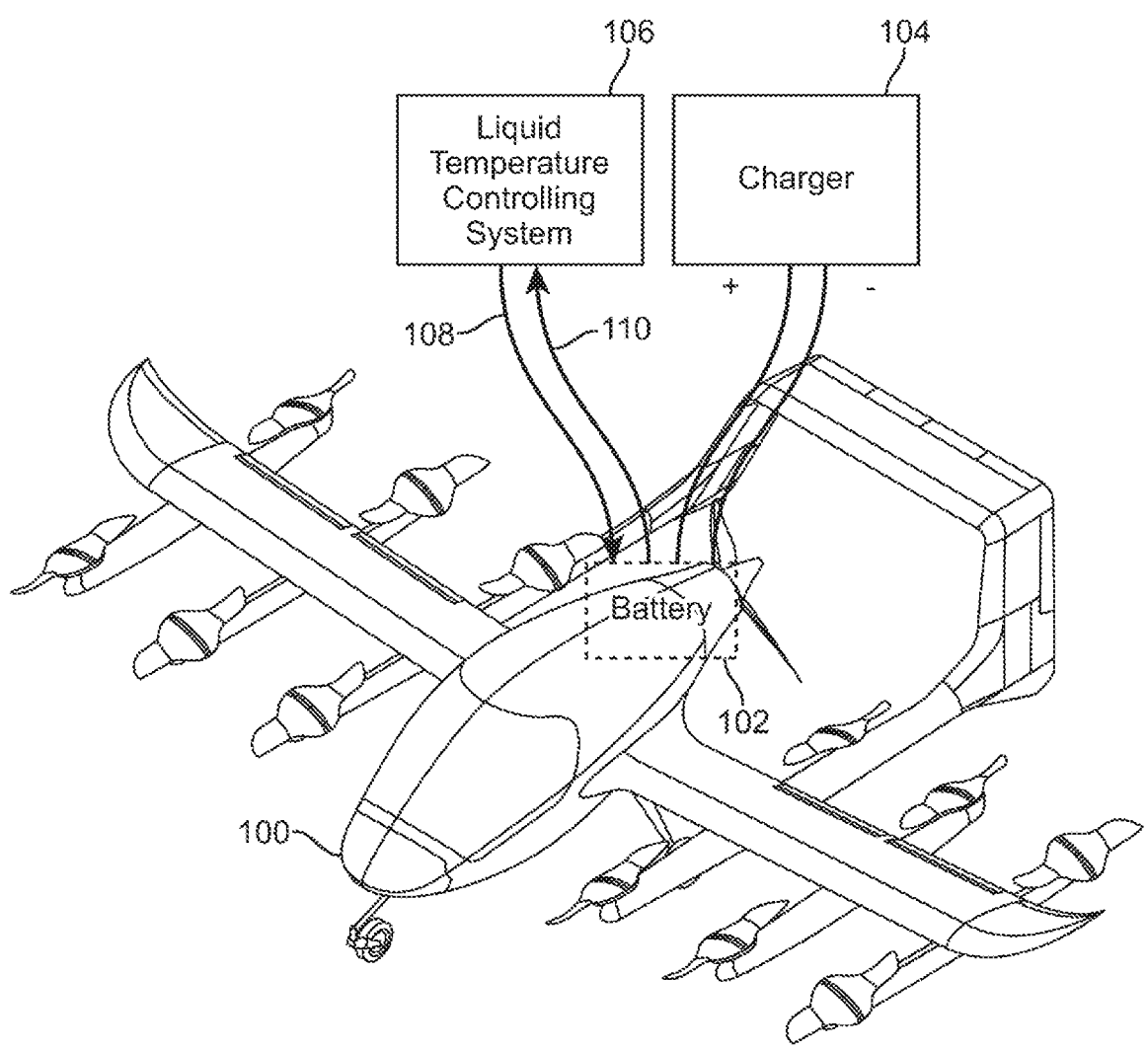
FIG. 1 is a diagram illustrating an embodiment of a battery in an aircraft that is temperature controlled using a liquid temperature controlling system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a battery that is temperature controlled using a liquid temperature controlling system (e.g., before, during, and/or after charging) are described herein. In some embodiments, a battery (e.g., in a vehicle) and a liquid temperature controlling system are detachably coupled (e.g., when the battery in the vehicle is going to be charged). A temperature controlled liquid (e.g., that has been heated or cooled) is circulated between the liquid temperature controlling system and the battery to produce a temperature controlled battery. In various embodiments, the liquid may be a gel, water, etc. The temperature controlled battery is charged (e.g., once the temperature controlled battery is within a range of temperatures at which charging is permitted; alternatively, charging may occur simultaneously as the battery is heated or cooled). The temperature controlled liquid is removed from the temperature controlled battery, and the battery and the liquid temperature controlling system are decoupled. As will be described in more detail below, this permits the battery to be cooled or heated to some desirable temperature using a liquid (e.g., which has better thermal properties than heating or cooling the battery using air) while avoiding the added weight of the liquid used for heating or cooling during flight or other travel.

FIG. 1 is a diagram illustrating an embodiment of a battery in an aircraft that is temperature controlled using a liquid temperature controlling system. In the example shown, the exemplary vehicle (100) is an all-electric aircraft that is entirely powered by a battery (102). When on the ground (as shown here) the battery is charged using a charger (104). In order for the vehicle to be ready for operation, the battery should be charged and the battery temperature should be within an acceptable range. Examples of when the battery temperature may be outside of an acceptable range include if the vehicle is stored outside in ambient temperatures below the acceptable battery temperature range, or if the vehicle's battery is charged rapidly such that its temperature is above the acceptable range.

In this example, the battery (102) is connected to a liquid temperature controlling system (106) so that the battery is temperature controlled while on the ground (e.g., before, during, and/or aftercharging). A temperature controlled liquid is passed to the battery (102) via an input hose or connection (108). For example, if the battery is too hot, a cooled or chilled liquid is pumped into the battery. Once in the battery, the cooled liquid (at least in this example) absorbs some of the heat from the battery. The warmed liquid then exits the battery via an output hose or connection (110) and returns to the liquid temperature controlling system (106) where the liquid is again cooled and returned to the input line (108).

For simplicity and ease of explanation, it is assumed that the battery (102) includes a temperature sensor and the measured temperature is communicated to the liquid temperature controlling system (106). In one example, the liquid temperature controlling system (106) receives the measured battery temperature via a battery management system. The battery management system is an existing, internal system in place that already measures battery temperature and communicates this to the charger. In one example, liquid temperature controlling system 106 is controlled via the same interface and/or device as the charger (104). This may be desirable because of the simplicity for ground personnel operating the system and/or for the ease of technical implementation (e.g., since all of the information required from the battery is already available at the charger).

Similarly, the liquid temperature controlling system (106) is assumed to have some desired battery temperature. For example, the desired battery temperature may be obtained or dictated by the battery cell operational limits as specified by the cell manufacturer. With both the measured temperature and desired temperature known, the liquid temperature controlling system can then decide whether to pump heated or cooled liquid into the battery and when to remove the liquid from the battery (e.g., because the measured temperature has reached the desired temperature and/or the battery has finished charging).

To keep the weight of the aircraft (100) down during flight, the heated or cooled liquid is only in the battery when the aircraft is on the ground. For example, when the liquid temperature controlling system (106) is first connected to the battery (102), any channels which the liquid would pass through in the battery would be air filled, not liquid filled. The liquid temperature controlling system (106) then pumps the heated or cooled liquid through the battery (102) in a closed and liquid-filled loop using the input and output connections (108 and 110) until the battery reaches the desired temperature. At that point, the channels in the battery would be liquid filled in order to heat or cool the battery (e.g., in order to improve charging time). The temperature controlled liquid is then drained from the battery (e.g., using passive techniques and/or active techniques) until none of it remains in the battery (102) and/or on the aircraft (100). The liquid temperature controlling system is then decoupled from the battery and the aircraft (e.g., with a recharged battery) can take off with no excess weight due to the liquid used to heat or cool the battery.

In some cases, the battery is warmed up. For example, during the winter, the battery may need to be warmed up to some minimum charging temperature before the battery can be charged for the first time on a given day. In such situations, the liquid that is pumped through the battery may be heated by the liquid heating and/or cooling system (106) to warm up the battery. Once the battery reaches the desired temperature (e.g., a minimum battery charging temperature), the charger (104) begins charging the battery (102).

With the exemplary liquid temperature controlling system shown here, the better thermal performance of a liquid can be leveraged (e.g., using a liquid can more quickly change the temperature of the battery compared to using air to heat or cool the battery) while avoiding the additional in-flight weight that the liquid would add if the liquid occupied the battery and/or aircraft during flight. The additional weight from the liquid would consume more power and correspondingly reduce flight time, which is undesirable. To put it another way, the exemplary liquid temperature controlling system has the better thermal properties of a liquid (e.g., compared to air) without the drawbacks (e.g., don't have to deal with the added weight of the liquid during flight).

In one example application, this system may be especially desirable or useful if the ambient temperature is relatively high (e.g., above 40° C.) or relatively low (e.g., below 0° C.). For example, if the aircraft is being flown on a very hot summer day, cooling the battery would reduce charging and/or turnaround time. In some cases, the aircraft is deployed in a fleet or shared usage application. Reducing the charging time in a fleet or shared usage application will reduce wait times for riders and/or permit more riders to be serviced.

The following figure describes these examples more generally and/or formally in a flowchart.

Figure 2:
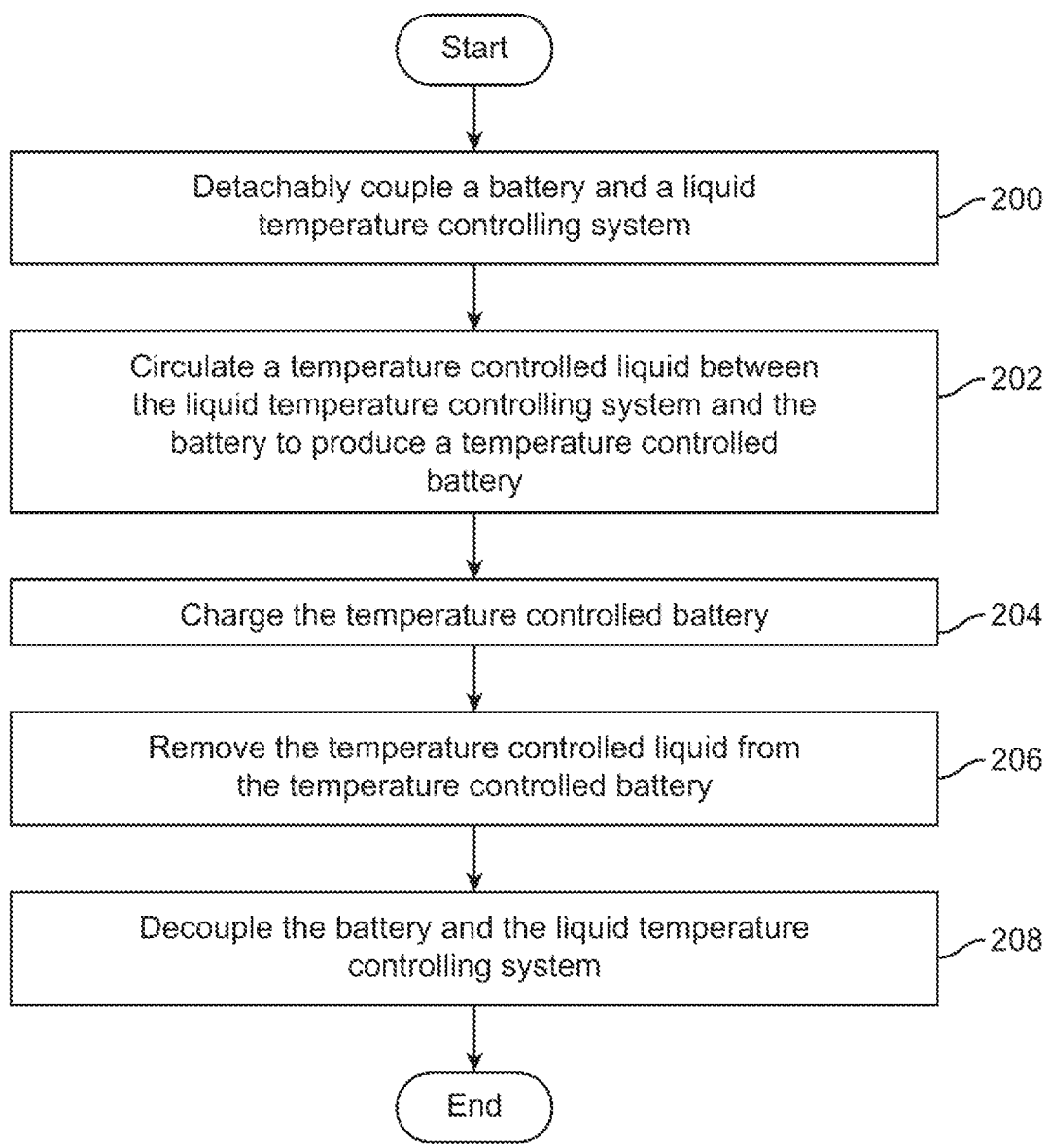
FIG. 2 is a flowchart illustrating an embodiment of a process to heat or cool a battery using a liquid temperature controlling system and charge the temperature controlled battery.

FIG. 2 is a flowchart illustrating an embodiment of a process to heat or cool a battery using a liquid temperature controlling system and charge the temperature controlled battery. As described above, this may help to reduce the amount of time to charge a battery (e.g., in a vehicle, such as an all-electric aircraft).

At 200, a battery and a liquid temperature controlling system are detachably coupled. For example, in FIG. 1, the input connection (108) and output connection (110) are connected to the battery (102), causing liquid temperature controlling system 106 and battery 102 to be detachably coupled to each other.

At 202, a temperature controlled liquid is circulated between the liquid temperature controlling system and the battery to produce a temperature controlled battery. For example, in FIG. 1, via the input connection (108), the liquid temperature controlling system (106) in FIG. 1 may pass a heated or cooled liquid to the battery. Once in the battery, the temperature controlled liquid heats or cools the battery, producing said temperature controlled battery. The liquid then exits the battery via the output connection (110). It is noted that prior to the coupling step at step 200, the exemplary battery (102) in FIG. 1 does not contain any of the liquid used to heat or cool the battery.

At 204, the temperature controlled battery is charged. For example, in FIG. 1, charger 104 would be used to charge battery 102, which is being temperature controlled by liquid temperature controlling system 106. In various embodiments, the charging at step 204 may occur at various times relative to the circulation of the liquid (that is, heating or cooling) at step 202. For example, suppose there is a range of acceptable temperatures at which it is safe or otherwise permissible to charge the battery. In one example, the measured temperature of the battery is within this acceptable range of temperatures and therefore charging at step 204 begins substantially at the same time as heating or cooling at step 202. In another example, the battery is too hot or cold to begin charging right away (i.e., the measured temperature is not within the range of acceptable battery charging temperatures). In that case, heating or cooling at step 202 would occur first. Then, when the measured temperature of the temperature controlled battery falls within the range of permitted battery charging temperatures, charging at 204 is triggered.

At 206, the temperature controlled liquid is removed from the temperature controlled battery. For example, in FIG. 1, the input connection (108) between the liquid temperature controlling system (106) and the battery (102) may blow air from the liquid temperature controlling system to the battery. This may help to flush out or otherwise actively clear the liquid from the battery. In some embodiments, passive techniques are used to remove the temperature controlled liquid from the battery. For example, gravity may be used to drain the temperature controlled liquid from the temperature controlled battery.

Removal of the temperature controlled liquid at step 206 may occur at a variety of times relative to the other steps. For example, if gravity is used to drain the temperature controlled liquid from the temperature controlled battery, it may take on the order of minutes as opposed to seconds. In some embodiments, to accommodate the relatively long draining time, draining (e.g., using gravity) at step 206 begins while the battery is still being charged at step 204. For example, if it takes approximately $T_{draining}$ amount of time to drain the temperature controlled liquid from the battery, draining may begin that amount of time before the expected end of charging (e.g., at step 204). Or, once the measured temperature of the battery reaches some desired temperature, the removal of the liquid from the battery begins.

Alternatively, if the temperature controlled liquid is removed using some faster and/or more active technique (e.g., the liquid temperature controlling system flushes the battery by pumping or blowing air through the input connection), charging at step 204 may complete first before the temperature controlled liquid is removed at step 206.

At 208, the battery and the liquid temperature controlling system are decoupled. For example, the hoses or connections between the liquid temperature controlling system (106) and the battery (102) in FIG. 1 would be detached or otherwise decoupled. With the battery charged, the temperature controlled liquid removed from the battery and vehicle, and all connections decoupled, the vehicle can resume travel (e.g., flight) with a recharged battery and none of the additional weight from the temperature controlled liquid.

As described above, with the liquid removed from the battery (and thus the vehicle), the vehicle does not have to expend power to transport any added weight from the liquid when subsequently traveling (e.g., flying). For example, if the vehicle is an all-electric aircraft, keeping the weight down by removing the liquid before takeoff can extend the flight time of the aircraft.

It may be helpful to show an exemplary battery and components which are used to create channels for the temperature controlled liquid to pass through the battery without damaging the battery (e.g., without the liquid coming into contact with any electronics or other sensitive components). The following figures describe one such exemplary battery system. First, an exemplary battery system without on-the-ground liquid heating or cooling features or components is described. Then, some examples of new components which permit on-the-ground liquid heating or cooling are described. Naturally, these examples are merely exemplary and are not intended to be limiting.

Figure 3A:
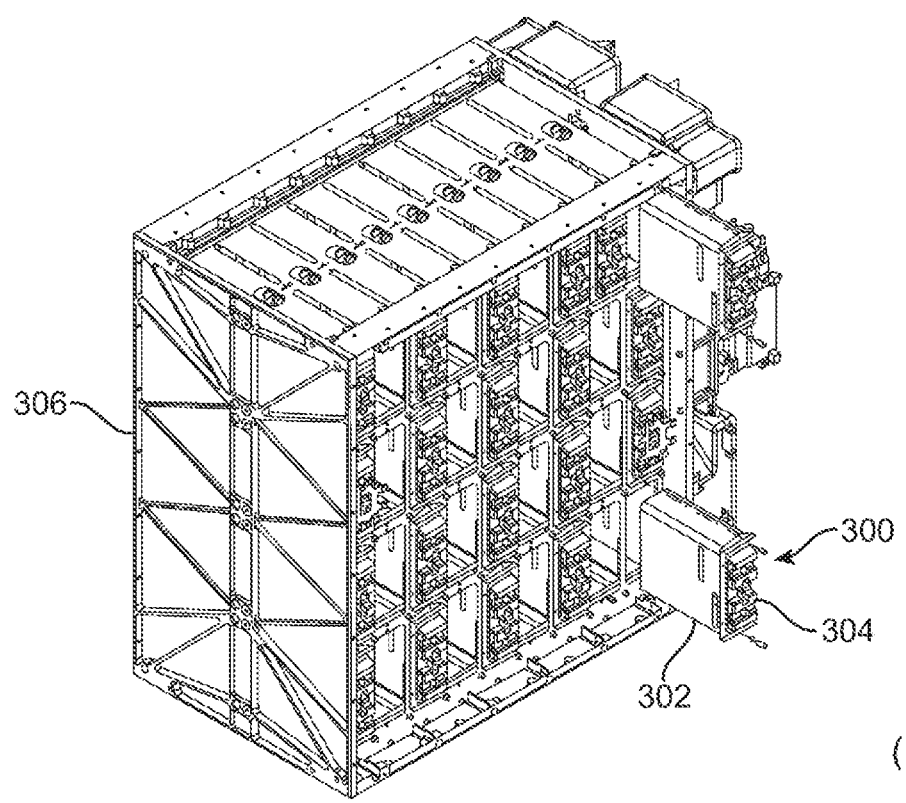
FIG. 3A is a diagram illustrating an example of a double-sided rack with battery submodules.

FIG. 3A is a diagram illustrating an example of a double-sided rack with battery submodules. In some embodiments, battery 102 in FIG. 1 is implemented using a double-sided rack (e.g., similar to the one shown here) with battery submodules.

In this example, the battery submodules (300) include battery cells (not shown) which are pouch cells. Pouch cells perform better when pressure is applied (e.g., ~3-5 PSI). More specifically, the cycle life of pouch cells can be extended by applying pressure to the pouch cells. For this reason, the battery cells in the battery submodule (300) are placed within a metal container (302) which compresses the battery cells within. The container (302) is sealed with a lid (304) which includes positive and negative terminals or connections.

The rack includes slots or openings for the battery submodules to be inserted into with the lid facing outward. To secure the battery submodules (300) to the rack (306), screws pass through holes in the lid and screw into the rack. By having the lids of the battery submodules face outwards, the positive and negative terminals or connections exposed by the lids can be electrically connected to each other and/or other electrical components (not shown).

The opposite side of the rack (not shown) includes another array of battery submodules and therefore the rack is referred to as a double-sided rack. It is noted that not all of the slots or openings in the figure shown here are filled with battery submodules but in an actual battery all of the slots or cutouts would be filled with a battery submodule.

Figure 3B:
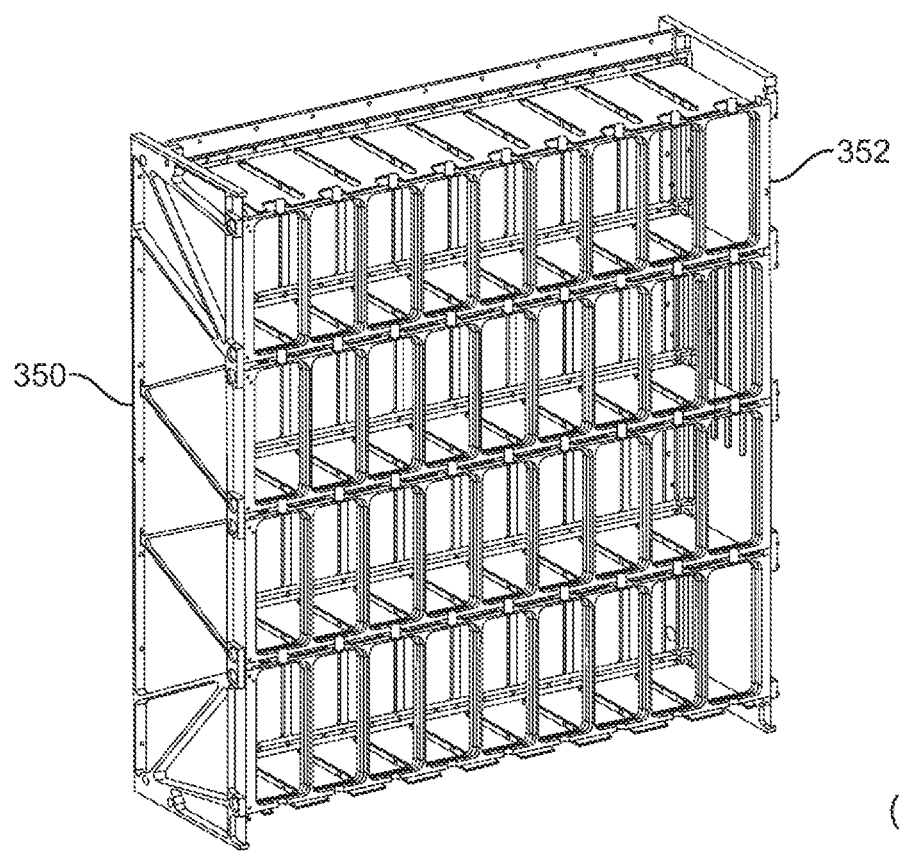
FIG. 3B is a diagram illustrating an example of a rack which includes support structures for the bottom portions of the battery submodules.

FIG. 3B is a diagram illustrating an example of a rack which includes support structures for the bottom portions of the battery submodules. For clarity, the rack in this FIG. (350) is shown without any battery submodules to obstruct the components shown here. In this example, the double-sided rack (306) from FIG. 3A has been cut in half down the middle with center portion (e.g., where the cut occurred) shown.

As shown from this view, the cut-in-half rack (350) includes a plurality of support structures (352) where each support structure corresponds to a row of battery submodules (not shown). The support structures are the part of the rack that come into (e.g., direct) contact with the battery submodules (not shown), specifically the bottom parts of the containers (e.g., away from the lids). For example, the support structures include rectangular cutouts with rounded edges for the battery submodules (more specifically, the bottoms of the containers) to be inserted into and sit in while the lids are screwed into the opposite (i.e., exterior) side of the rack to secure the battery submodules to the rack. The following figure shows a closer view of exemplary support structure 352.

Figure 4A:
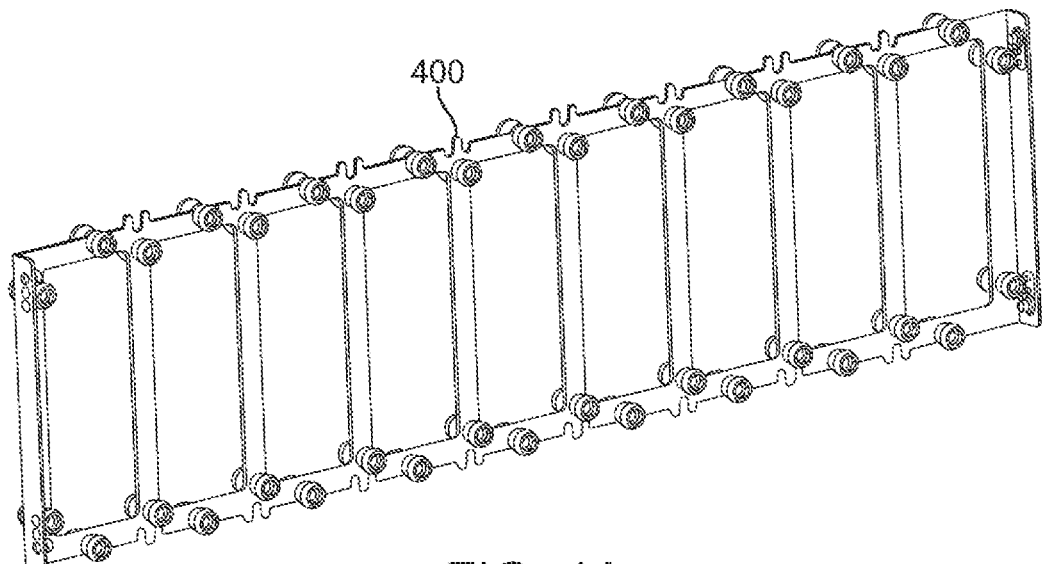
FIG. 4A is a diagram illustrating an example of a support structure without o-rings.

FIG. 4A is a diagram illustrating an example of a support structure without o-rings. In this example, support structure 400 shows a closer view of support structure 352 from FIG. 3B. As shown here, the exemplary support structure is relatively thin and only provides structural support (e.g., without any thermal control or management features).

The following figure shows an example of a thicker support structure with o-rings. Such a support structure may be used to form channels or paths for temperature controlled liquid to come into direct contact with the battery submodules in that support structure so that the overall battery system can be cooled or heated (e.g., using the system shown in FIG. 1 and described in FIG. 2).

Figure 4B:
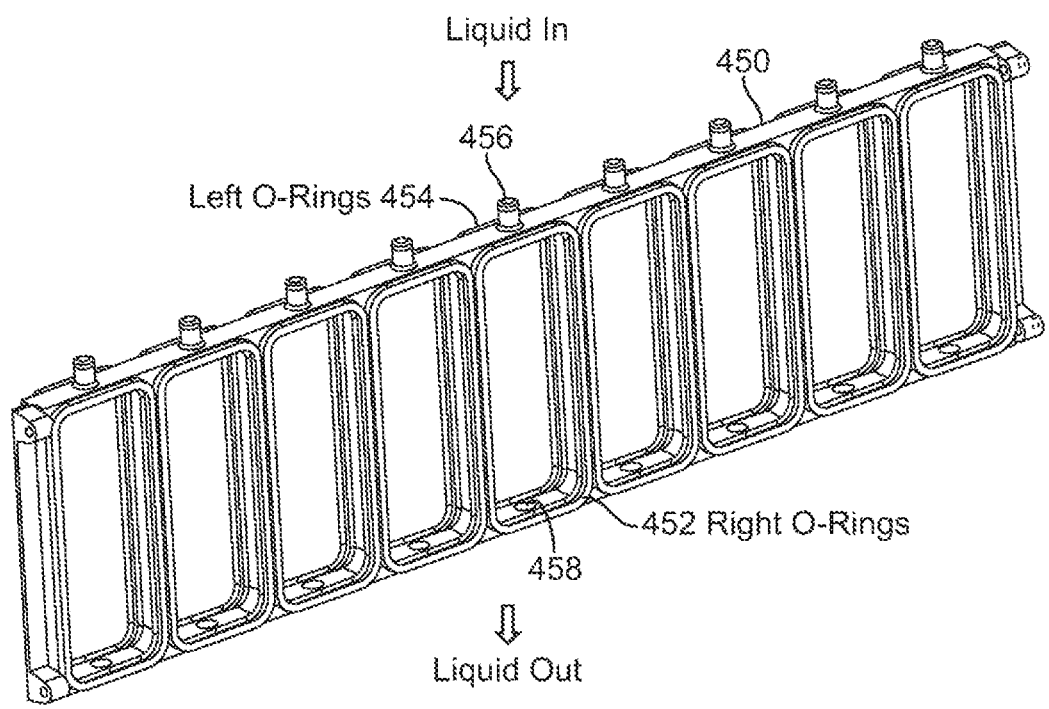
FIG. 4B is a diagram illustrating an embodiment of a support structure with two sets of o-rings to form channels for temperature controlled liquid to come into direct contact with the battery submodules.

FIG. 4B is a diagram illustrating an embodiment of a support structure with two sets of o-rings to form channels for temperature controlled liquid to come into direct contact with the battery submodules. In the example shown, support structure 450 is thicker than support structure 400 shown in FIG. 4A. This thickness is used to create channels or pathways for temperature controlled liquid to come into direct contact with the battery submodules that are inserted into support structure 450, thus heating or cooling the battery submodules and the overall battery system.

Support structure 450 sits in the center of the battery's frame and interfaces with battery submodules on each side (e.g., a left row of battery submodules and a right row of battery submodules) to create cooling channels. For example, the left o-rings (454) form seals around battery submodules (more specifically, around the bottom of the containers) on the left (not shown) and the right o-rings (452) form seals around battery submodules on the right.

When a left and right battery submodule (not shown) are inserted into one of the cutouts in the support structure, the left o-ring and right o-ring they come into contact with (respectively) will create a ring or band around the bottoms of the containers of the battery submodules (not shown) for the temperature controlled liquid to come into direct contact with the container of the battery submodule. Since the exemplary container is metal and direct contact is made between the battery submodules and the liquid, a good thermal interface is created for the temperature controlled liquid to heat or cool those two battery submodules. The relatively large amount of surface area on the bottom surface of the container also helps with heating or cooling.

In this example, to take advantage of gravity, the temperature controlled liquid enters the support structure through a male connector (456) at the top of the support structure and exits via a female connector (458) at the bottom of the support structure. The heights of the male connectors may be sized so that the female connector from one row fits into the male connector in the next lower row. This permits the temperature controlled liquid to first heat or cool battery submodules in the topmost row, then drop down into the next lower row and heat or cool battery submodules and the next row and so on.

Returning briefly to FIG. 2, as shown in FIG. 4B, in some embodiments circulating the temperature controlled liquid at step 202 includes circulating the temperature controlled liquid through a channel formed using the container and an o-ring configured to fit around the container, wherein the temperature controlled liquid comes into direct contact with at least the bottom surface of the container when in the channel. In some embodiments (also shown in FIG. 4B), the channel formed using the first container, the second container, a first o-ring configured to fit around the first container, and a second o-ring configured to fit around the second container, wherein the temperature controlled liquid comes into direct contact with at least the bottom surface of the first container and the bottom surface of the second container when in the channel. FIG. 4B also shows that in some embodiments, a support structure includes the first o-ring and the second o-ring and the temperature controlled liquid enters the channel from a first opening at a top side of the support structure and exits the channel from a second opening at a bottom side of the support structure. As described above, having the liquid enter from above and exit from below takes advantage of gravity.

One benefit to using a support structure similar to that shown in FIG. 4B is that the design of the overall battery system does not need to be significantly reworked. For example, the added thickness of the support structure shown in FIG. 4B may be relatively small and the battery can still fit into the allocated space in the fuselage of the aircraft (see, e.g., FIG. 1 where the battery (102) has to fit into the fuselage behind the cockpit). The exemplary support structure shown may also be weight-efficient because it heats or cools battery submodules on both sides using a single structure (e.g., as opposed to having one structure for the right side and another structure for the left side), which keeps the weight of the battery down. Also, the support structure permits the temperature controlled liquid to flow across the bottom surface of the containers, which offer a relatively large surface area (e.g., good for heating or cooling).

The following figure shows where the temperature controlled liquid would come into contact with a battery submodule using the exemplary support structure shown in FIG. 4B.

Figure 5:
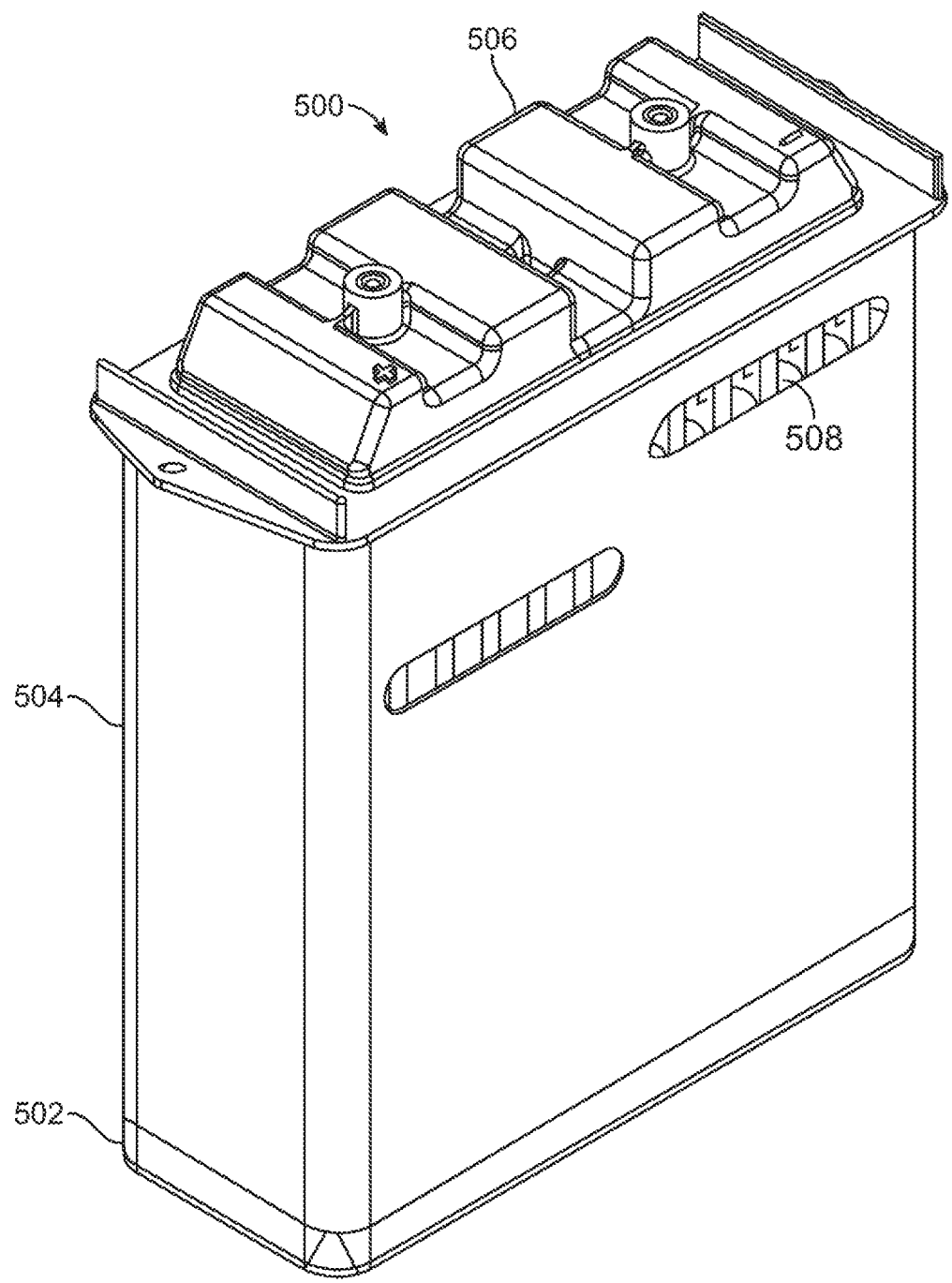
FIG. 5 is a diagram illustrating an embodiment of where temperature controlled liquid comes into contact with a battery submodule.

FIG. 5 is a diagram illustrating an embodiment of where temperature controlled liquid comes into contact with a battery submodule. In the example shown, battery submodule 500 is secured to a rack using support structure 450 shown in FIG. 4B. The bottom portion (502) of the container (504) is where the temperature controlled liquid comes into (direct) contact with the container. Either the right or left o-ring (not shown) would fit around the container, ensuring that the liquid stays in the region shown (502) and does not come into contact with any delicate or sensitive electronics. For example, it would be undesirable if the liquid escaped from the o-ring and came into contact with the cutouts (508) in the container which are used to vent hot gases in the event of a thermal runaway. The cutouts may only be moderately protected from water intrusion with tape over the cutout.

Figure 6:
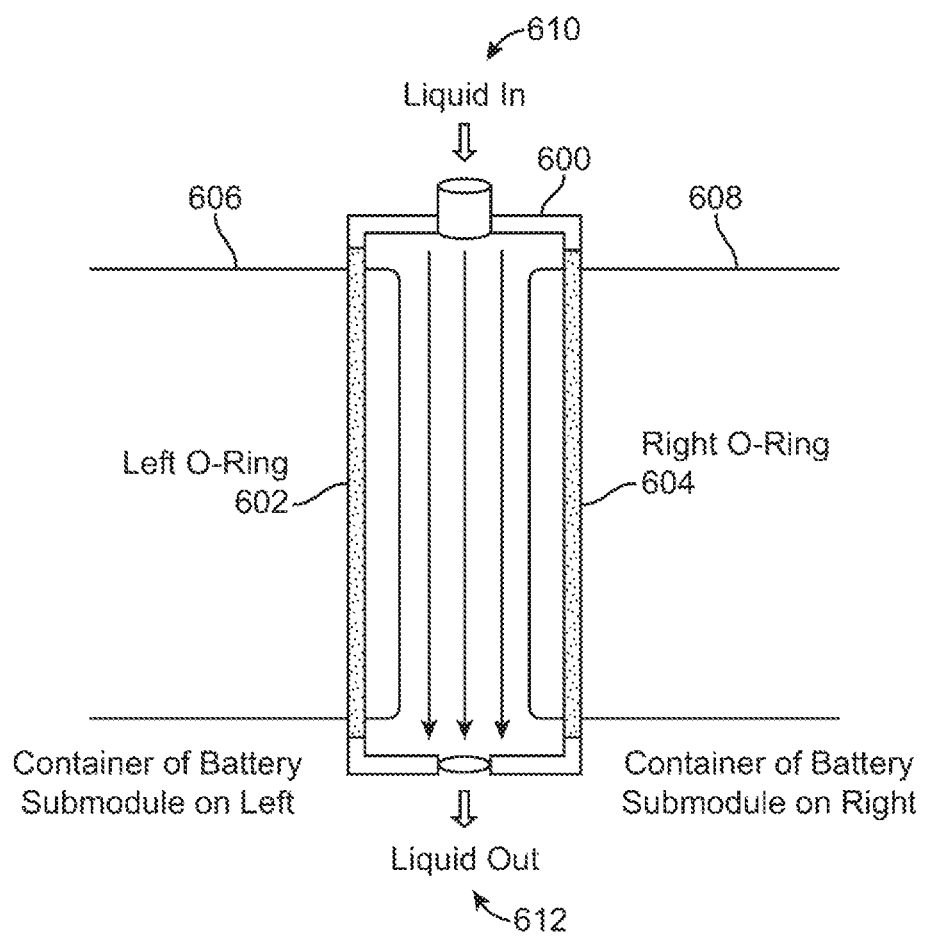
FIG. 6 shows a cross sectional view of a channel formed by a support structure with o-rings.

FIG. 6 shows a cross sectional view of a channel formed by a support structure with o-rings. In this example, support structure 450 from FIG. 4B forms the exemplary channel shown here for temperature controlled liquid to flow through. In this example, support structure 600 includes a left o-ring (602) and a right o-ring (604). The left o-ring (602) fits around a container (606) of a battery submodule inserted from the left hand side. Similarly, the right o-ring (604) fits around a container (608) of a battery submodule inserted from the right hand side. Liquid in (610) enters from the top of the support structure, flows past the bottom surfaces of the two containers (606 and 608), and then exits as liquid out (612) at the bottom of the support structure.

In this example, support structure 450 from FIG. 4B has walls or barriers between each of the cutouts for the battery submodules. As such, each left-right pair of battery submodule has its own separate channel and the temperature controlled liquid which heats or cools one pair will not mingle with the temperature controlled liquid which heats or cools a neighboring pair in the same row. For example, it may be designed this way because to allow for better uniformity of the fluid flow rate around each pair, and thus more uniform heat transfer throughout the battery. Naturally, in some other embodiments, a support structure has openings or connections between adjacent pairs so that the temperature controlled liquid can mingle across different neighboring pairs in the same row.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
    a plurality of batteries including a first battery and a second battery;
    a support structure coupled to the plurality of batteries, the support structure including:
        a first seal provided on a first surface of the support structure around the first battery; and
        a second seal provided on a second surface opposite to the first surface of the support structure around the second battery,
        an opening for receiving a portion of the first battery and a portion of the second battery, wherein the opening extends between the first seal and the second seal;

a channel formed within the opening between the portion of the first battery and the portion of the second battery;

an inlet provided on a top surface of the support structure adapted to receive a fluid;

an outlet provided on a bottom surface of the support structure adapted to receive the fluid after the fluid travels through the channel in direction of gravity, wherein the channel extends between the inlet and the outlet.

2. The system of claim 1, wherein the first seal or the second seal includes an o-ring.

3. The system of claim 1, wherein the support structure includes a plurality of channels, such that a respective channel is formed between each pair of adjacent batteries among the plurality of batteries.

4. The system of claim 1, wherein the plurality of batteries include a first set of batteries and a second set of batteries that extend parallel to the first set of batteries along a horizontal plane, the first set of batteries including the first battery, the second set of batteries including the second battery.

5. The system of claim 1, wherein the system is coupled to a battery-powered aircraft, the system further comprising:
 a liquid temperature controlling system coupled to the battery-powered aircraft when the battery-powered aircraft is on ground, wherein the liquid temperature controlling system is configured to:
  detachably couple the support structure and the plurality of batteries to the liquid temperature controlling system;
  circulate a temperature controlled liquid as the fluid through the channel to produce a plurality of temperature controlled batteries, wherein the temperature controlled fluid comes into direct contact with the plurality of batteries;
  remove the temperature controlled liquid from the plurality of temperature controlled batteries; and
  decouple the plurality of temperature controlled batteries and the liquid temperature controlling system.

6. The system of claim 5, wherein removing the temperature controlled liquid from the plurality of temperature controlled batteries includes blowing air from the liquid temperature controlling system to the plurality of batteries.

7. The system of claim 5, wherein removing the temperature controlled liquid from the plurality of temperature controlled batteries includes using gravity to drain the temperature controlled liquid from the plurality of temperature controlled batteries.

8. The system of claim 1, the system is coupled to a battery-powered aircraft, and wherein the fluid traveling through the channel in the direction of the gravity is air while the battery-powered aircraft is on the air.

9. A method comprising:
 providing a system including a plurality of batteries coupled to a support structure in a battery-powered aircraft, wherein the support structure includes:
  a first seal provided on a first surface of the support structure around a first battery; and
  a second seal provided on a second surface opposite to the first surface of the support structure around a second battery,
  an opening for receiving a portion of the first battery and a portion of the second battery, wherein the opening extends between the first seal and the second seal;
  a channel formed within the opening between the portion of the first battery and the portion of the second battery;
  an inlet provided on a top surface of the support structure adapted to receive a fluid;
  an outlet provided on a bottom surface of the support structure adapted to receive the fluid after the fluid travels through the channel in direction of gravity, wherein the channel extends between the inlet and the outlet;
 detachably coupling the support structure and the plurality of batteries to a liquid temperature controlling system;
 circulating a temperature controlled liquid through the channel of the support structure to produce a plurality of temperature controlled batteries, wherein the temperature controlled fluid comes into direct contact with the plurality of batteries;
 removing the temperature controlled liquid from the plurality of temperature controlled batteries; and
 decoupling the plurality of temperature controlled batteries and the liquid temperature controlling system.

10. The method of claim 9, wherein removing the temperature controlled liquid from the plurality of temperature controlled batteries includes:
 blowing air from the liquid temperature controlling system to the plurality of batteries.

11. The method of claim 9, wherein removing the temperature controlled liquid from the plurality of temperature controlled batteries includes:
 using gravity to drain the temperature controlled liquid from the plurality of temperature controlled batteries.

12. The method of claim 9, wherein the first seal or the second seal includes an o-ring.

13. The method of claim 9, wherein the support structure includes a plurality of channels, such that a respective channel is formed between each pair of adjacent batteries among the plurality of batteries.

14. The method of claim 9, wherein the plurality of batteries include a first set of batteries and a second set of batteries that extend parallel to the first set of batteries along a horizontal plane, the first set of batteries including the first battery, the second set of batteries including the second battery.

* * * * *